United States Patent [19]

Kypreos et al.

[11] 4,042,968
[45] Aug. 16, 1977

[54] HIGH-VOLTAGE ELECTRICAL INSTALLATION

[75] Inventors: Georges Kypreós, Ste. Foy les Lyon; Lucien Orgeret, Lyon, both of France

[73] Assignee: Delle-Alsthom, Villeurbanne, France

[21] Appl. No.: 664,638

[22] Filed: Mar. 8, 1976

[30] Foreign Application Priority Data

Mar. 14, 1975 France .................................. 75.08648

[51] Int. Cl.² .............................................. H02H 3/26
[52] U.S. Cl. ........................................ 361/60; 307/17; 307/19; 361/63; 361/67
[58] Field of Search ................... 317/16, 20, 26, 27 R, 317/29 R, 44; 307/12, 13, 19, 17, 51, 70; 324/59; 361/52, 58, 59, 60, 61, 62, 63, 65, 67, 68, 107

[56] References Cited

U.S. PATENT DOCUMENTS

| | | | |
|---|---|---|---|
| 3,421,052 | 1/1969 | Hammarlund | 317/26 |
| 3,873,887 | 3/1975 | Barkan et al. | 317/20 |
| 3,879,639 | 4/1975 | Sircom | 317/27 R |
| 3,909,677 | 9/1975 | McClain | 317/26 |
| 3,970,898 | 7/1976 | Baumann et al. | 317/29 R |

Primary Examiner—Gerald Goldberg

[57] ABSTRACT

High-voltage high-power, multiphase electrical installation comprising, for each phase, at least two circuit fields that include, in each circuit field, a circuit breaker arranged between two current transformers, each of them discharging into the same load as the homologous current transformers of the other circuit fields having the same phase; isolating switches placed at the ends; earth isolators placed between the isolating switches and the current transformers. The magnetic circuit of the current transformers is crossed simultaneously by the conductor of the phase of the circuit field and by an auxiliary conductor connected; on the one hand, to a ground isolator and, on the other hand, to a ground point.

7 Claims, 8 Drawing Figures

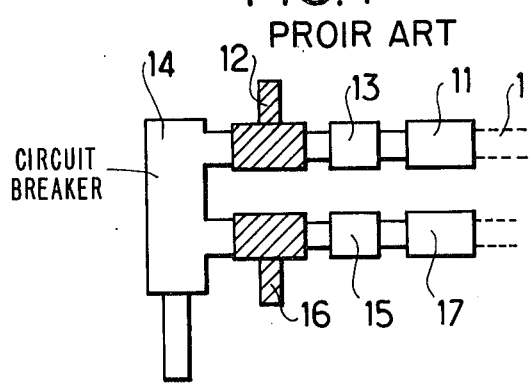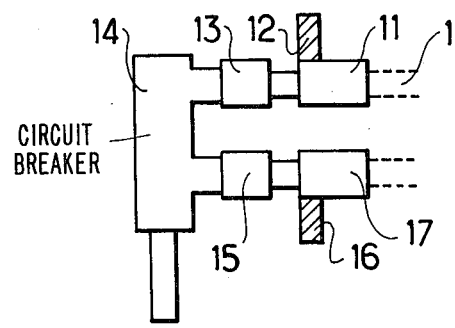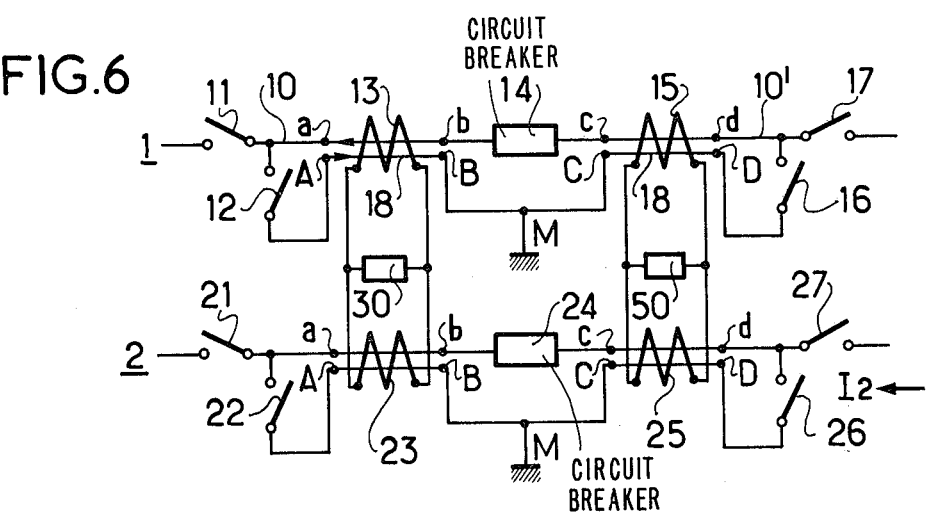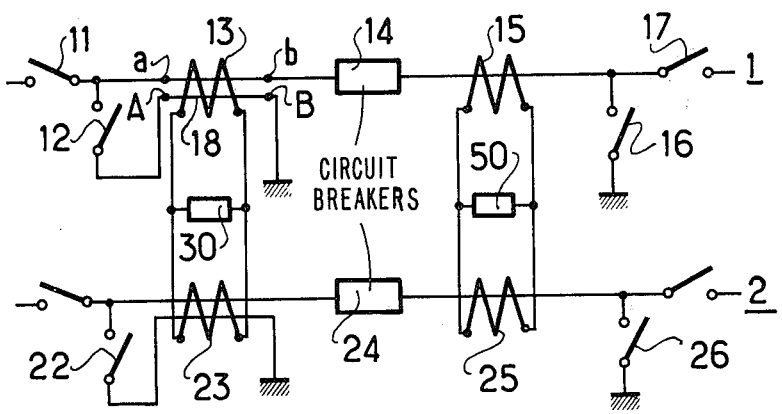

HIGH-VOLTAGE ELECTRICAL INSTALLATION

The invention concerns a high-voltage electrical installation and, more particularly, the location of a ground isolator of a circuit breaker, more particularly in cellular switchboards or in stations of the classical type.

In a high-voltage high-power three-phased electrical installation, it is frequent to use, for the same phase, two or several circuit fields. Circuit fields usually comprise a circuit breaker arranged between two sets of elements, each comprising an isolating switch, a ground isolator and a current transformer.

The object of the invention is an arrangement making it possible to prevent the current transformers of each phase discharging to the same load from bringing about an error in measurement during the keeping in service of one of the circuit fields and the putting out of service of the other circuit field of this phase.

The invention has, moreover, as its object, an arrangement which is more simple and more economical than known arrangements, more particularly for cellular switchboards.

The invention has as its object a high-voltage electrical installation comprising, for each phase, at least two circuit fields, each circuit field comprising, along a phase conductor, a circuit breaker arranged between first and second isolating switches, a first current transformer being arranged between the first isolating switch and the circuit breaker, a second current transformer being arranged between the circuit breaker and the second isolating switch, the first current transformer of the various circuit fields being connected to a first common load, the second current transformers being connected to a second common load, a first ground isolator being connected to the phase conductor between the first current transformer and the first isolating switch, and a second ground isolator being connected to the phase conductor between the second current transformer and the second isolating switch. According to the invention, the magnetic circuit of each current transformer which is connected to the same load is crossed simultaneously by the phase conductor of the circuit field to which that current transformer belongs, and further comprising an auxiliary conductor connecting a ground isolator of the same circuit field at least temporarily to ground.

According to another characteristic, the ground isolators are integrated with the isolating switches arranged in the vicinity.

The characteristics and advantages of the invention will become apparent from the description given herebelow and illustrated in the figures, wherein FIG. 1 is a diagram of a conventional arrangement leading to errors in measurement;

FIG. 4 is a known example of embodiment of a circuit field according to the solution in FIG. 3, in the case of cellular switchboards;

Figure 8:
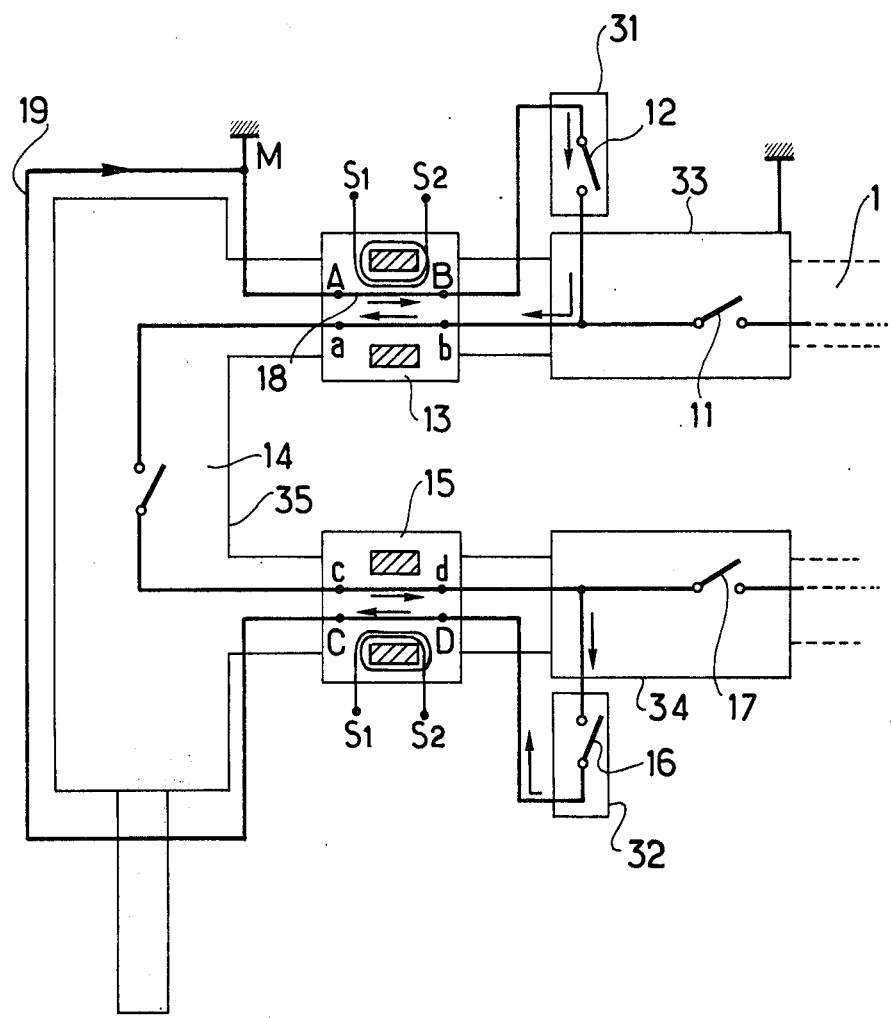

FIG. 5 corresponds to the arrangement of a circuit field according to the invention, in the case of cellular switchboards;

FIG. 6 is a diagram of an arrangement according to the invention;

FIG. 7 is a variant of the diagram of an arrangement according to the invention; and FIG. 8 is an example of embodiment of an arrangement according to the invention, applied to a cellular switchboard.

Figure 1:
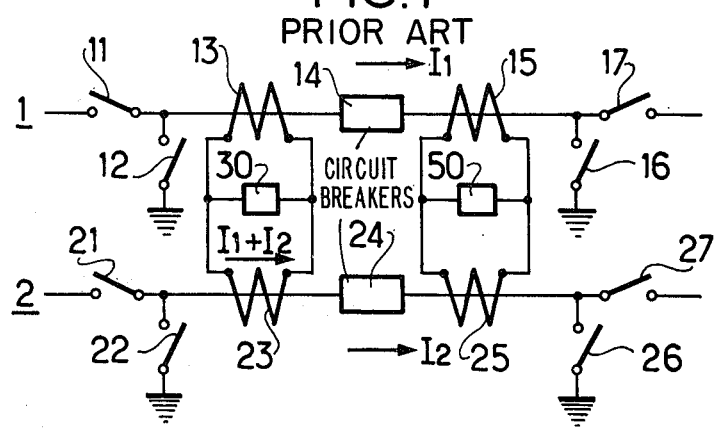
Figure 2:
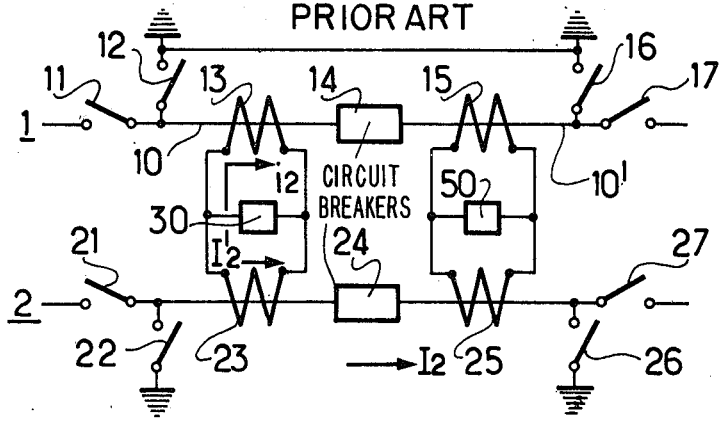
FIG. 2 is a diagram explaining the error in measurement in the conventional arrangement.

In the FIGS. 1 and 2 are two known circuit fields having the same phase in a high-voltage electrical installation. A circuit field 1 comprises, at its ends, isolating switches 11 and 17 arranged on both sides of a circuit breaker 14. A current transformer 13, 15 is arranged between each of the isolating switche 11 and 17 and the circuit-breaker 14.

Likewise, a circuit field 2 comprises, at its ends, isolating switches 21 and 27, arranged on both sides of a circuit breaker 24. A current transformer 23, 25 is arranged between each of the isolating switches 21 and 27 and the circuit breaker 24. The homologous current transformers 13 and 23 of the circuit fields 1 and 2 are connected to a common load 30, and the homologous current transformers 15 and 25 of the circit fields 1 and 2 are connected to another common load 50.

In the usual circuitry, it is possible for the current transformers of two circuits fields to discharge into the same load. This is the case in FIG. 1, with the current transformers 13 and 23 of the circuit fields 1 and 2 discharging into the load 30. The transformation ratio apart, the current which passes into that load is the sum of the currents discharged by each circuit field, that is, $I_1 + I_2$. Now, if it is assumed that the circuit field 1 is isolated by the isolating switches 11 and 17, which are open and when it is required, for example, to effect maintenance of the circuit breaker 14 of the circuit field 1, ground isolations 12 and 16 of the circuit field 1 must be closed.

Circuit field 2 has similar ground isolators 22 and 26, as shown.

The circuit breaker 24 of the circuit field 2 and the isolating switches 21 and 27 of the circuit field 2 possibly remaining closed, a closed loop, will then have been established, which is illustrated in FIG. 2, constituted by a phase conductor 10 between the isolating switch 11 and the circuit-breaker 14, a phase conductor 10' between the circuit-breaker 14 and the isolating switch 17, the ground isolators 12 and 16, and a ground conductor connecting the ground isolators 12 and 16.

The impedance of the current transformer 13, seen from the low-voltage side or load side, is then very low compared with that which would have been obtained if the primary winding had been open, that is, if the ground isolators 12 and 16 had been open. The consequence of this is that the current which passes into the load 30 is not equal to $I_2$ but to $I'_2$, which is less than $I_2$. If metering is effected, for example, a slight current is measured.

Figure 3:
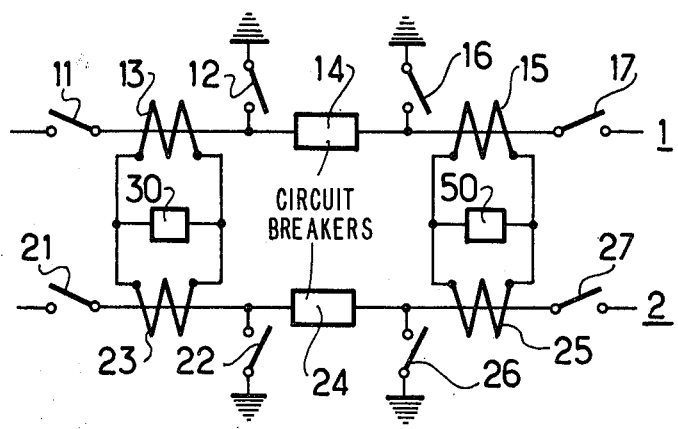
FIG. 3 is a diagram showing a conventional solution preventing the error in measurement.

To avoid that disadvantage in usual circuitry, a solution, illustrated in FIG. 3, consists in installing the ground isolators 12 and 16 between the circuit breaker 14 and the current transformers 13 and 15. In this way, when the ground isolators 12 and 16 are closed, the closed loop which they constitute with the circuit breaker 14 and the earth conductor has no influence on the impedance of the current transformer 13 seen from the load side 30.

But that arrangement complicates the embodiment of the stations and increases their bulk. Indeed, it is not possible to take advantage of the isolating switch and more particularly of its support insulator, for example, to joint thereto the active part of the ground isolator.

On the contrary, a complete ground isolator must be installed, hence with a support insulator and extra connections, which this arrangement entails, between the circuit-breaker and the current transformer.

FIG. 4 shows a known application, which results from the arrangement in FIG. 3, in the case of an enclosed station. The ground isolators 12 and 16 illustrated by the shaded surfaces constitute a great amount of equipment and large bulk in comparison with the circuitry in FIG. 5 according to the invention, in which they are joined to the isolating switches 11 and 17.

According to the invention, it is possible to install the earth isolators 12 and 16 beside the isolating switches 11 and 17 (see FIG. 5), or to join them thereto and to prevent, in the case of closing of the ground isolators 12 and 16, the measurement from becoming erroneous, as is explained herein-above with reference to the example of FIG. 2.

Moreover, a circuit whose induced flux is zero is constituted with the primary conductor of the transformer 13. This is done by making a loop pass inside the magnetic circuit without closing round it, the loop therefore not surrounding the induction flux.

FIG. 6 shows that arrangement diagrammatically. The primary conductor of the transformer 13 having terminals $a$ and $b$, which is in series with the phase conductor 10, and an auxiliary conductor 18 having terminals A and B, cross the magnetic circuit of the transformer 13. That auxiliary conductor 18 has its end B connected to a grounding point M and its end A connected to the ground isolator 12. In these conditions, when the circuit field 1 is, as shown in FIG. 6, isolated by the switches 11 and 17 and the ground isolators 12 and 16 are closed, the part $ab$AB of the closed loop, materially shown by the arrows, is inside the magnetic circuit of the current transformer 13. In that part, the induced flux is zero. The result of this is that the impedance seen from the load side 30 is high, this making it possible, in the latter, to make a correct measurement of the current $I_2$ of the circuit field 2 in service.

Of course, that solution can be applied to any required number of current transformers. If each circuit-field phase comprises several magnetic circuits of current transformers, an auxiliary conductor 18 can cross one, several or all of those magnetic circuits.

Thus, in FIG. 6, not only does the transformer 13 have an auxiliary conductor 18 which crosses it at AB, but also, the transformer 15 comprises a ground conductor 18 which crosses it at CD, whereas in FIG. 7, only the transformer 13 is concerned by that arrangement, while the transformer 15 is not. In FIG. 6, the respective primary circuits of the transformers 13, 15 are designated $a, b$ and $c, d$, respectively.

It should be observed that this arrangement of the invention is equivalent to the use of two half-circuits in opposition.

An example of embodiment having no limiting character in an enclosed station insulated by gases is shown in FIG. 8. Casings 31 and 32 containing the ground isolators 12 and 16 are electrically insulated from casings 33, 34, 35 of the other elements such as isolating switches 11 and 17, circuit breaker 14, etc... The auxiliary conductor 18 passes inside the magnetic circuit (shown by the shaded surfaces) of the current transformer 13 and is connected to ground by its end A and by its other end B to the casing 31 of the ground isolator 12. The case is the same with the current transformer 15.

If, therefore, the isolating switches 11 and 17 are open and when it is required to close the earth isolators 12 and 16, the circuit breaker 14 being closed and if secondary windings $S_1S_2$ of the current transformer 13, in relation with the load 30, but not illustrated and/or that of the current transformer 15, is fed by the winding of a neighbouring circuit field, a zero flux will be obtained in the part $ab$-AB and/or $cd$-CD, as explained previously.

The auxiliary conductor 18 having terminals AB and/or that having terminals CD can be installed either permanently, whether the circuit field be in service or not, or, even temporarily when the circuit field is isolated and when it is required to effect maintenance.

Moreover, if the auxiliary conductor 18 having terminals AB and/or that having terminals CD is installed permanently, its two ends can be or not permanently connected, the one to ground, the other to the ground isolator. Nevertheless, if the ends are not permanently connected, it is necessary to ground the contact of the ground isolator and, moreover, the casing, in the case of cellulor switchboards.

What is claimed is:

1. A multi-phase high-voltage electrical installation comprising, for each phase, at least two circuit fields, each field including, along a phase conductor, a circuit breaker arranged between first and second isolating switches; a first current transformer arranged between said first switch and said circuit breaker; a second current transformer arranged between said circuit breaker and said second switch; said first transformers of said circuit fields being connected to a first common load, said second transformers being connected to a second common load; a first ground isolator connected to said phase conductor between said first transformer and said first switch; a second ground isolator connected to said phase conductor between said second transformer and said second switch; wherein the magnetic circuit of each said current transformers, which are connected to the same load, is crossed simultaneously by said phase conductor of the circuit field to which that transformer belongs; and an auxiliary conductor connecting said ground isolator of the same circuit field at least temporarily to ground.

2. The electrical installation as defined in claim 1, wherein said ground isolators are integrated with said isolating switches that are arranged in their vicinity.

3. The electrical installation as defined in claim 1, wherein said auxiliary conductor constitutes a permanently installed fixed circuit.

4. The electrical installation as defined in claim 1, wherein said auxiliary conductor is a circuit installed at the time of putting said circuit field out of service.

5. The electrical installation as defined in claim 1, wherein said ground connection of the auxiliary conductor is permanent.

6. The electrical installation as defined in claim 1, wherein said ground connection of the auxiliary conductor is effected at the time of putting said circuit field out of service.

7. The electrical installation as defined in claim 1, which is formed in a cellular switchboard.

\* \* \* \* \*